United States Patent [19]
Barnes

[11] 3,874,060
[45] Apr. 1, 1975

[54] METHOD OF FABRICATING A DEMOUNTABLE ROD

[75] Inventor: Richard D. Barnes, Costa Mesa, Calif.

[73] Assignee: The Conlon Corporation, Santa Ana, Calif.

[22] Filed: June 18, 1974

[21] Appl. No.: 480,381

[52] U.S. Cl............. 29/416, 29/458, 29/525, 43/18 R, 43/18 GF, 264/159, 264/267, 264/295
[51] Int. Cl............. B23p 17/00
[58] Field of Search............ 29/416, 525, 458, 445, 29/527.1, 530; 403/361, 221, 228, 345; 264/267, 295, 159; 43/18 R, 18 GF; 285/54, 55, 423

[56] References Cited
UNITED STATES PATENTS

| | | | |
|---|---|---|---|
| 3,048,432 | 8/1962 | Harter | 43/18 R X |
| 3,152,820 | 10/1964 | Giampa et al. | 43/18 GF X |
| 3,368,271 | 2/1968 | Scheffler | 29/416 X |
| 3,519,294 | 7/1970 | Barnes | 43/18 GF X |
| 3,554,590 | 1/1971 | Tarantino | 43/18 GF |
| 3,609,906 | 10/1971 | Johnson et al. | 43/18 GF |
| 3,718,967 | 3/1973 | Stevens | 29/525 X |
| 3,830,008 | 8/1974 | Johnson | 43/18 R |

Primary Examiner—C. W. Lanham
Assistant Examiner—Victor A. De Palma
Attorney, Agent, or Firm—J. Bradley Cohn

[57] ABSTRACT

A demountable fishing rod is formed as a single tapering tube with a thickened central portion, the tube is cut in two at the large end of the thickened central portion to form a butt portion and a tip portion, the tapering butt portion is sized and coated with a mold release agent, the thickened portion is reamed out larger than the end of the butt portion, molding material is placed in the reamed out enlarged portion, and the butt portion is inserted in the reamed out enlarged portion while the molding material hardens to provide a demountable joint.

4 Claims, 5 Drawing Figures

METHOD OF FABRICATING A DEMOUNTABLE ROD

BACKGROUND OF THE INVENTION

In the manufacture of fiberglass tubes for use as fishing rods, it is difficult and costly to fabricate rod sections having tapered sleeves and plugs to enter the sleeves to provide a connection for a demountable rod. The process of this invention forms a superior demountable rod at less cost.

SUMMARY OF THE INVENTION

A demountable fishing rod is formed by fabricating a tapered fiberglass tube with a central externally thickened portion. The large end of the tube is turned or otherwise sized to taper to the thickened portion which is preferably cut to form a rear shoulder. The tube is then cut in two adjacent to the shoulder of the thickened portion to form a butt portion with a tapered end and a tip portion terminating at the shoulder of the thickened portion. The thickened portion is reamed out to form an opening larger than the tapered end of the butt portion. The butt portion is coated with a release agent and a molding material is placed in the reamed opening. The taper of the butt portion is inserted in the reamed opening while the molding material cures or hardens to form a demountable joint. Upon removal of the tapered end of the butt portion from the opening, a small part of the end of the butt portion may be cut off so that its taper may always be jammed tightly into the taper formed by the molding material in the opening.

The method of this invention provides an unusually strong and inexpensive demountable joint in a fiberglass rod which is aesthetically pleasing in its appearance.

DESCRIPTION OF THE PREFERRED EMBODIMENT

Figure 2:
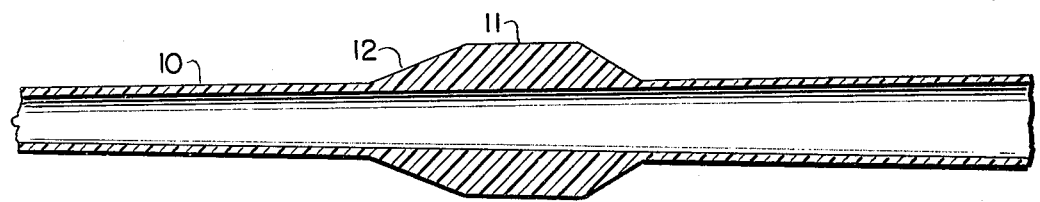
FIG. 2 is a longitudinal section through a broken away center of a tapered fiberglass tube having a central thickened portion.
Figure 3:
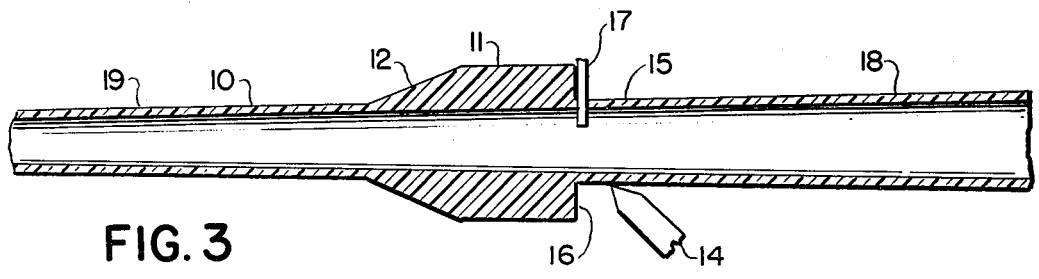
FIG. 3 is a longitudinal section through the tube of FIG. 2 being turned and cut in two to form a butt and a tip portion of a rod.

As shown in FIG. 2, a tapered tube 10 is formed with an externally thickened central portion 11 having a smooth taper 12 at its end disposed toward the smaller diameter of the tube 10. As may be seen in FIG. 3, the rod 10 is turned so that a tool 14 may form a smooth taper 15 on the tube 10 and it may form a rearward facing shoulder 16 on the thickened central portion 11. The rod 10 is then cut in two by the saw 17 or the like to form a tapered butt portion 18 and a tip portion 19.

Figure 4:
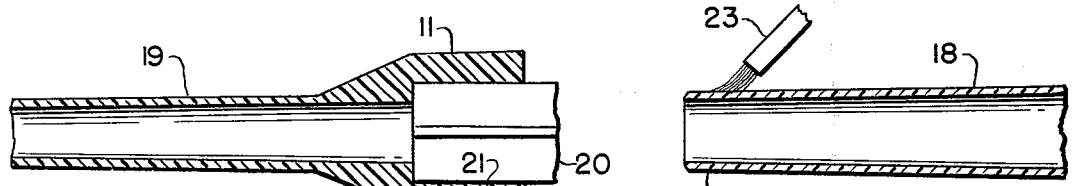
FIG. 4 is a longitudinal section through a broken away end of the tip portion having an enlarged opening being reamed therein.
Figure 5:
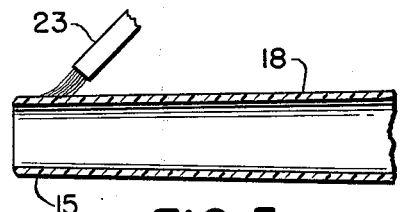
FIG. 5 is a longitudinal section through the butt portion being coated with a mold release agent.
Figure 1:
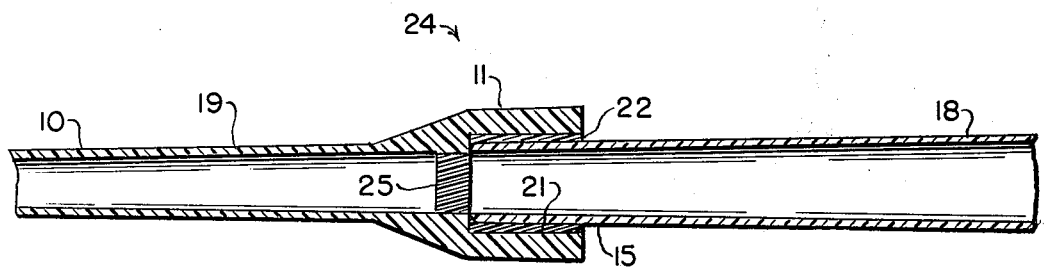
FIG. 1 is a longitudinal section through the broken away butt and tip portions of a demountable rod formed according to the method of this invention.

As shown in FIG. 4, a suitable tool 20 reams an opening 21 larger than the front of butt portion 18 in the thickened central portion 11. The opening 21 has a molding material 22 placed therein as shown in FIG. 1. The tapered tip 15 of the butt portion 18 is coated with a mold release agent as shown in FIG. 5 by a brush 23 or the like. The butt portion 18 is then inserted into opening 21 while the molding material 22 hardens or cures to form a rod 10 having a demountable joint 24. If desired, molding material may form a plug 25 in the tip portion 19 at the bottom of opening 21. A similar plug (not shown) may be formed at the end of butt portion 18. Further, a small part of the tip of butt portion 18 may be cut off after it is removed from the hardened molding material 22 so the tapered end 15 may be tightly jammed into the enlarged portion 11.

The method of construction of this invention provides a stronger and less costly fiberglass rod with a demountable joint. While being described as a demountable fishing rod, this invention may be used to fabricate other demountable rods. Although turning, sawing, and other specific techniques are described, their equivalents may be used.

I claim:

1. The method of fabricating a demountable rod comprising the steps of:
   a. forming a tapered fiberglass tube having a thickened central portion with an outwardly thickened wall;
   b. smoothing the taper of the larger end of the tube adjacent to the thickened central portion;
   c. cutting the tube in two adjacent to the thickened central portion forming a tapered butt portion and a tip portion having the thickened portion at the large end thereof;
   d. reaming an opening in the end of the thickened portion larger than the small end of the butt portion;
   e. placing a molding material in the opening;
   f. coating the smaller end of the butt portion with a mold release agent; and
   g. inserting the smaller end of the butt portion in the opening while the molding material hardens to form a demountable joint.

2. The method of claim 1 wherein step (b) additionally involves forming a rearwardly facing shoulder on the thickened central portion.

3. The method of claim 1 with the additional step of:
   h. removing the butt portion from the opening and cutting a small end portion from the butt portion.

4. The method of claim 1 in which step (a) additionally involves forming the thickened central portion with a taper extending toward the smaller end of the tube.

* * * * *